2,865,759

CATALYTIC MODIFICATION OF FATS

Theodore J. Weiss, Park Forest, Lars H. Wiedermann, Des Plaines, and Glen A. Jacobson, Brookfield, Ill., assignors to Swift & Company, Chicago, Ill., a corporation of Illinois No Drawing. Application September 22, 1955
Serial No. 536,053

13 Claims. (Cl. 99—118)

This invention relates to an improvement in the catalytic modification of fats by alkali metals and to an improved catalyst.

Alkali metal catalysts such as metallic sodium and potassium have been widely used in the modification of various vegetable oils and animal fats and mixtures thereof. For example, in the crystal modification of lard in accordance with the process disclosed in Dominick et al. 2,625,484, metallic sodium may be conveniently used as well as in the directed interesterification discussed by Ecky in Industrial & Engineering Chemistry, volume 40, pages 1183–1189, 1949. Alkali metal catalysts have been widely employed in various processes for the treatment of glycerides. The term modification is used herein to include any treatment of fats involving the use of an alkali metal catalyst. In the use of an alkali metal catalyst, it is necessary to add water to the modified fatty material in order to deactivate the catalyst upon completion of the process. Large quantities of hydrogen are evolved with the result that there is considerable agitation of the modified fat resulting in the formation of a troublesome foots-fats emulsion. The deactivated alkali metal catalyst provides a positive metal ion which combines with the free fatty acid present to form troublesome soaps. These soaps together with some of the water and a small amount of entrapped oil make up the foots. These foots must be separated from the modified fat. Consequently, the formation of the foots-fats emulsion is objectionable as it slows up the separation. Long periods of time in the neighborhood of one hour or longer are necessary to bring about the settling out of the foots and not infrequently it becomes necessary to add an electrolyte, usually sodium chloride, to the modified fat to salt out the foots. Following the settling out of the foots, it is conventional practice to pass the whole mass through a diatomaceous earth filter. If the filtering be carried on too soon, the emulsion may interfere with proper separation of the foots.

The alkali metal catalyst may be introduced to the fat in a liquid dispersion. These dispersions are prepared by stirring the molten metal at a high speed of 15,000 to 20,000 R. P. M. in the inert medium, e. g. mineral oil. In some instances, the metallic catalyst is added directly in a molten form to the fat being modified but this latter practice is hazardous as even a small amount of water present in the fat or a leaky steam line may produce an explosion. Both of these methods of introducing the catalytic material are to varying degrees inefficient inasmuch as the sodium or other alkali metal is not finely dispersed throughout the fat.

We have discovered that the foregoing difficulties may be obviated by the use of an improved catalyst made up of an alkali metal dispersed on a finely ground electrolytic carrier such as sodium chloride. The alkali metal so dispersed on the electrolyte presents a larger surface for the catalytic reaction and the use of sodium chloride or other electrolyte as the carrier has the further advantage that it is intimately mixed in the fatty material and gives, with the destroying of the catalyst with water, an immediate flocculation of the soaps, thus hastening the breaking of the foots-fats emulsion and the settling out of the foots. It may be that the presence of the salt throughout the fatty material at the time of deactivation of the catalyst prevents the formation of the emulsion, but in any event, whether the sodium chloride serves to prevent the formation of the emulsion or hastens the breaking of the emulsion, our process is a considerable improvement over conventional practice.

In its broad aspects, we contemplate in our invention the improvement in the modification of glycerides, the steps of contacting the glyceride with an alkali metal catalyst dispersed on an electrolytic carrier to bring about the modification of the fat. On completion of the modification process, the alkali metal catalyst is deactivated with water and thereafter the modified glyceride is separated from the foots, resulting from the deactivation of the catalyst. Various electrolytic carriers may be employed. Our electrolyte is sodium chloride as it is plentiful, efficient and inexpensive. Other electrolytes such as potassium sulfate, potassium chloride, and anhydrous sodium sulfate may be used.

In our preferred embodiment, we employ a joint carrier for the alkali metal made up of an electrolyte and silica. The combination carrier has the advantage over an electrolyte carrier per se in that the silica is more readily wet by the alkali metal and hence less of the joint carrier is required for the same amount of alkali metal, with the result there is less inert matter and in the separation of the foots which will include the carrier, there is less of the modified fat retained in the foots. Combination carriers having an electrolyte and silica present in the amounts of 1 part of the electrolyte to 18 parts of silica have been successfully used; however, from our experience, we have concluded that an electrolyte-silica ratio of 1:9 is to be preferred as it gives a more rapid settling of the foots. The combination carrier having a 1:9 ratio will support approximately 50% of its weight in sodium where the electrolyte and silica have been ground through a 300 mesh screen. Further, increasing the proportion of the electrolyte decreases the sodium carrying power of the joint carrier and apparently does not substantially increase the coagulating effect of the electrolyte on the foots.

The foots resulting from the practice of our process are more compact and dry than that possible with the use of conventional catalysts and there is less retention of the modified fat in the foots, making for a more economical process. Although loss of fats in the foots varies with the efficiency of the various processing methods and equipment used, it has been generally observed that our improved process reduces loss by from 25 to 50% of the loss in the old process.

The alkali metal catalyst may be prepared by stirring the molten metal with a dry inert powdered solid carrier. The metal easily wets and flows over the surface of the carrier so that the mixing can be accomplished with an agitator moving within the range of 50–500 R. P. M. The alkali metal dispersion on the solid carrier is relatively easy to handle as it is a dry powder. It is our belief that the surface area of our dry powdered catalyst is from 100 to 1,000 times that of the alkali metal suspended in a liquid dispersion.

The powdered catalyst may be prepared by placing one part of sodium chloride or other electrolyte along with 9 parts of silica, both ground through a 300 mesh screen, in a container, preferably under a blanket of dry nitrogen after first removing the air. The stirrer speed is then adjusted to within the range of 50–500 R. P. M. and the carrier material heated to about 150° C. At this point, 5 parts of the sodium metal is placed in the container and after the sodium has melted, agitation is continued for about 5 minutes. The powdered catalyst, if not used immediately, should be stored in a metal container placed in a dry area away from flammable materials. It is best that the powdered catalyst be stored and transferred under an inert atmosphere.

The following examples illustrate the present invention in connection with the use of sodium and are not to be construed as limiting the scope of the invention.

*Example I*

A powdered catalyst was prepared in the manner described above from a mixture of 1 g. sodium chloride and 9 g. silica. Five grams sodium was mixed with the joint carriers. The silica and sodium chloride had been preground through a screen of 300 mesh. The finished catalyst was a free flowing powder. The foregoing catalyst mixture was used to crystal modify 1 kg. lard at a temperature of 100° C. Twenty grams of water was used to kill the catalyst on completion of the crystal modification. The foots broke readily and were dry and filtration was rapid and clean with a 91% yield of the modified lard. As a control, 5 g. of molten sodium was dripped into 1 kg. of lard with continuous agitation of the lard being carried on. The lard was held at a temperature of 100° C. Upon completion of the crystal modification which required a period somewhat longer than that of the test, 20 g. of water was used to kill the catalyst. A stubborn emulsion of foots and fat was formed and 2½ hours was required for settling of the foots. The mass was then filtered. There was a loss of 20% of the modified lard in the foots.

*Example II*

In the work of this example, 40 g. of sodium chloride, powdered through a 300 mesh screen, were dried at 120° C. in a 200 ml. 3 neck flask provided with a motor driven stirrer of the type that would sweep the bottom of the flask. Nitrogen gas was used to displace the air in the flask. Ten grams of metallic sodium were placed in the flask and stirred into the sodium chloride at 300 R. P. M. The sodium upon melting readily covered the entire mass of salt. The resulting mixture appeared as a dry, gray, free flowing powder. After cooling, the sodium-sodium chloride mixture was used to catalyze the crystal modification of 2,000 g. of lard. The lard had been previously dried and heated to 100° C. before introduction of the catalyst. The catalyst was stirred into the lard and dispersed readily without formation of lumps. Modification was completed in 3 minutes. 30 ml. of water were then added to destroy the sodium. In this instance, a dry, crusty layer of foots formed on the surface after a short period of foaming due to the evolution of hydrogen gas. Filtration to remove the foots was rapid and gave a clear oil. The entire separation of foots took only 2 minutes. As a control, a like amount of sodium was dispersed on powdered silica, a non-electrolyte and used to crystal modify 200 g. of lard. Here on the deactivation of the sodium with water, there was intense foaming and the settling of the foam to permit filtration of the oil took several hours. This example illustrates the effectiveness of the use of an electrolyte in the separating out of the foots.

*Example III*

The work of Example II was repeated with the lard modification reaction being carried out at 50° C. The reaction required 35 minutes, approximately the same length of time required when using sodium methoxide as the catalyst. It will be noted that here the modification was carried out below the melting point of sodium which is 97.5° C., while in the preceding example, the temperature was above the melting point. Here, as in the preceding example, the foots separated rapidly and filtration was immediately possible. Again, the entire separation of foots required only a brief period.

*Example IV*

A carrier consisting of 1 g. sodium chloride and 9 g. silica, both ground through a screen of 250 mesh, was used to disperse 5 g. sodium metal in the same manner as previously described. The mixture was used to modify 1000 g. of lard at 90° C. On completion of crystal modification, the sodium was destroyed by the addition of 20 ml. water. The foots separated with ease and the oil filtered rapidly and was free of soap. There was a loss of 8.8% of crystal modified lard in the foots.

Five grams of sodium was dispersed in a like manner on 10 g. of silica. An identical modification was carried out with the sodium being destroyed by 20 ml. water containing 1 g. of sodium chloride. The entire mass of oil frothed increasing to 4 times the original volume. This was typical of the water killed catalyst containing no salt. However, the foam did break readily taking only 5 minutes. The resulting foots were not dry and the filtration of the oil was made difficult by the gummy condition of the foots. The loss of modified lard in the foots was 13.0%.

*Example V*

Five grams of sodium were dispersed on 1 g. potassium chloride and 9 g. of silica in the manner described previously. Both the potassium chloride and silica had been finely ground through a screen of 300 mesh. This catalyst mixture was used to interesterify 1000 g. of coconut oil at 100° C. for 1 hour. Upon addition of 20 ml. water to kill the catalyst, the foots separated readily and in a relatively dry condition. A control was run by dripping 5 g. of molten potassium into 1,000 g. of coconut oil, again held at 100° C. for 1 hour. A like amount of water was employed to destroy the catalyst. Sodium chloride was added to the modified coconut oil to break the stubborn emulsion of fat and foots formed with the addition of the water. Even with the assistance of the electrolyte, 1½ hours was required to settle the foots.

*Example VI*

An oil jacketed, ribbon blender of 1 cu. ft. capacity was provided with gas connections to permit the use of a nitrogen atmosphere. The blender was charged with 1# sodium chloride and 9# silica, both ground to pass through a 300 mesh screen. This was dried at 125° C. with agitation and a gentle sweep of nitrogen gas. Five pounds of sodium were added and mixing continued for a half hour at 125° C. under the nitrogen blanket. The entire mass of catalyst was then added to 2500# of dry lard at 92° C. in a closed steam jacketed vessel under 1# nitrogen pressure. The lard was agitated for 15 minutes during which time the typical brown color indicative of crystal modification was developed. The vessel was then placed under vacuum and 5 gallons of water were added to destroy the catalyst. The hydrogen gas that evolved was drawn off rapidly for the vacuum. There was no appreciable waiting period necessary for the settling out of the foots which were dry and subsequent to this, the entire mass was passed through a diatomaceous earth filter where the foots were readily separated from the modified lard.

In a comparable run wherein a like amount of molten sodium was dripped into 2500# of dry lard with agitation, 30 minutes was required to complete crystal modification. In this instance, after destroying the catalyst, one hour was needed to effect the settling out of the foots to an extent which would permit the filtration in the manner described above. Even then, the foots were somewhat gummy and interfered to some extent with the filtering in contrast to the relative dry foots of the test lard which were easily filtered.

Obviously, many modifications and variations of the invention as hereinbefore set forth may be made without departing from the spirit and scope thereof and therefore only such limitations should be imposed as are indicated in the appended claims.

We claim:
1. In the modification of glycerides, the improvement comprising: contacting the glyceride with an alkali metal catalyst dispersed on an electrolytic carrier comprising an inorganic alkali metal salt of a strong acid to bring about modification of the fat, deactivating the alkali metal catalyst with water and thereafter separating the modified glyceride from the foots resulting from the deactivation of the catalyst.

2. A proces in accordance with claim 1 wherein the alkali metal catalyst is sodium.

3. A process in accordance with claim 1 wherein the alkali metal catalyst is potassium.

4. A process in accordance with claim 1 wherein the electrolytic carrier is sodium chloride.

5. A process in accordance with claim 1 wherein the electrolytic carrier is potassium sulfate.

6. A process in accordance with claim 1 wherein the electrolytic carrier is potassium chloride.

7. A process in accordance with claim 1 wherein the electrolytic carrier is anhydrous sodium sulfate.

8. In the modification of a glyceride, the improvement comprising: contacting the glyceride with an alkali metal catalyst dispersed on a joint carrier made up of silica and an inorganic alkali metal salt of a strong acid to effect said modification of the glyceride, deactivating the catalyst with water and thereafter separating the modified glyceride from the foots resulting from the deactivation of the catalyst.

9. A process in accordance with claim 8 wherein the alkali metal catalyst is sodium and the aklali metal salt is sodium chloride and wherein the components of the joint carrier are present in the amounts of approximately 9 parts of silica and 1 part of sodium chloride.

10. In the crystal modification of lard, the improvement comprising: contacting the lard with an alkali metal catalyst dispersed on an electrolytic carrier comprising an inorganic alkali metal salt of a strong acid under conditions adequate to bring about said modification of the lard, deactivating the catalyst with water and thereafter separating the crystal modified lard from foots resulting from the catalyst deactivation.

11. A composition of matter for the catalytic treatment of a glyceride, comprising an alkali metal catalyst dispersed on a joint carrier made up of silica and an inorganic alkali metal salt of a strong acid.

12. A composition of matter in accordance with claim 11 wherein the alkali metal salt is sodium chloride.

13. A composition of matter in accordance with claim 11 wherein the alkali metal catalyst is sodium and wherein the alkali metal salt is sodium chloride.

References Cited in the file of this patent
UNITED STATES PATENTS

| | | |
|---|---|---|
| 1,885,653 | Zutphen | Nov. 1, 1932 |
| 2,625,479 | Mattil et al. | Jan. 13, 1953 |
| 2,625,484 | Dominic et al. | Jan. 13, 1953 |

FOREIGN PATENTS

| | | |
|---|---|---|
| 342,107 | Great Britain | Jan. 29, 1931 |